Sept. 29, 1953  R. H. WEILAND  2,653,691
ANTIFRICTION SCREW REVERSIBLE BRAKE MECHANISM
Filed March 30, 1951
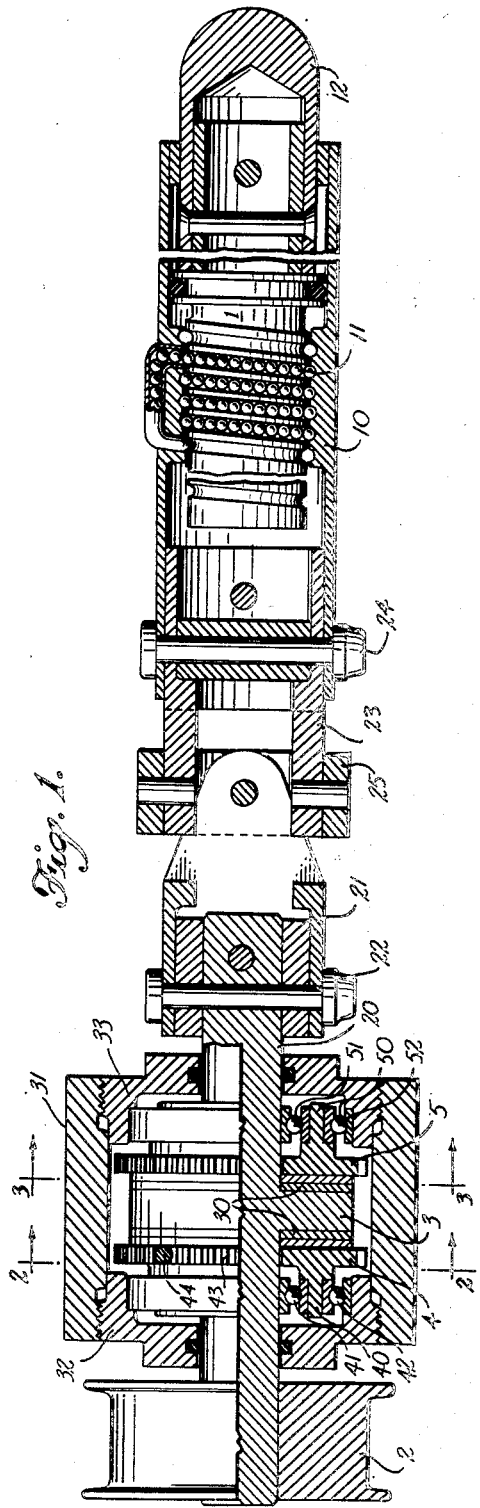
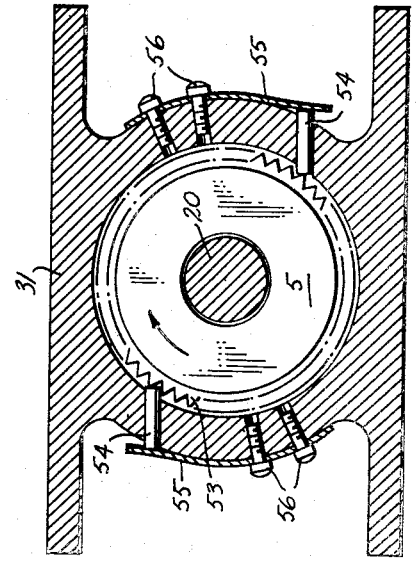
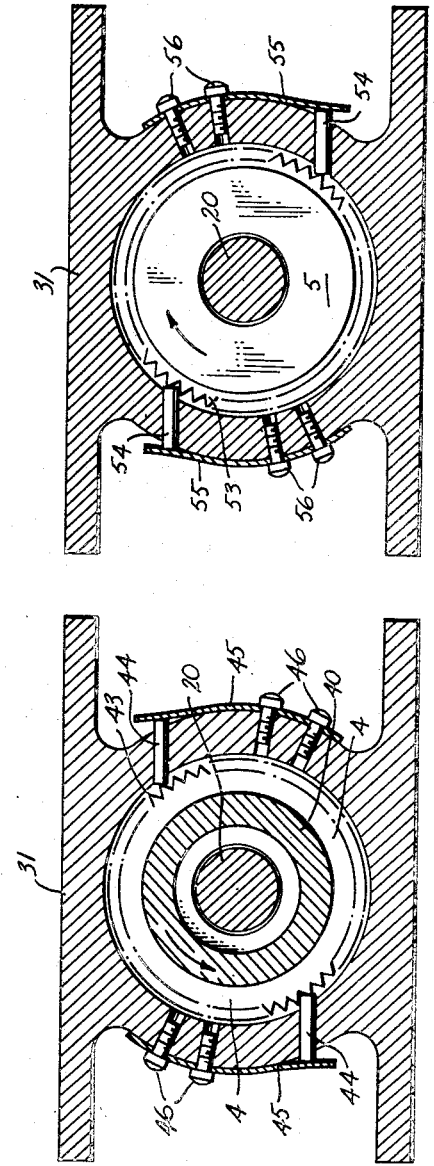
INVENTOR.
RICHARD H. WEILAND
BY
ATTORNEYS

UNITED STATES PATENT OFFICE 2,653,691

ANTIFRICTION SCREW REVERSIBLE BRAKE MECHANISM

Richard H. Weiland, Seattle, Wash., assignor to Boeing Airplane Company, Seattle, Wash., a corporation of Delaware Application March 30, 1951, Serial No. 218,382

2 Claims. (Cl. 192—8)

The present invention relates to mechanism for controlling an antifriction screw actuator, so that the load cannot act to drive the power source in either direction, while the power source is able to drive the antifriction screw mechanism either with or against the load while at the same time obtaining the benefit of the antifriction character of the mechanism. Moreover, such mechanism is operable in the same fashion in whichever direction the load acts on the antifriction screw, and whether or not the direction or load action reverses during operation of the mechanism.

By reason of its versatility as mentioned above, the controlled antifricion screw mechanism is well adapted for applications in which the axial load on the antifriction screw actuator must be driven, yet reverses either periodically or at different stages of the operation. The mechanism is therefore unaffected by rapidly reversing axial loads, for example, which tend to cause rotative oscillation.

While it is a principal object of the invention to prevent axial loading of an antifriction screw mechanism from having a rotative effect on rotary drive mechanism for moving such antifriction screw mechanism in the direction in which the load acts or in the direction opposed to the action of the load, it is an important object to provide such control without sacrificing appreciably the increased mechanical efficiency normally afforded by a screw mechanism of the antifriction type.

In antifriction control mechanism for accomplishing purposes of this invention the factors of simplicity of construction and reliability of operation are important, and in the present invention duplicate parts preferably are provided to decrease the possibility of failure of the mechanism.

The device of the present invention is particularly suitable for use in airplane control systems, because it is very compact and light.

An additional important feature of the control mechanism is that a minimum of backlash or lost motion is involved in its operation, so that as long as power is applied to drive the actuator in one direction or the other the actuator will be moved, but, almost immediately upon interruption of the drive rotation, movement of the actuator by the force of the load is prevented.

In carrying out the principles of the invention to accomplish the objects mentioned above, the control mechanism includes a double friction clutch unit interposed between the drive and the antifriction screw mechanism. With each friction clutch unit is associated a holding device which limits one element of each friction clutch mechanism to rotation in only a single direction, and such holding mechanisms act in opposite senses, so that an element of one friction clutch can rotate only in the direction opposite that in which the corresponding element of the other friction clutch is capable of rotating. Moreover, such elements are permitted to rotate only in the respective directions opposite the direction in which a load on the antifriction screw actuator would tend to rotate such elements. Thus, an axial load in one direction on one element of the antifriction screw mechanism will have the double effect of creating pressure between the elements of one clutch and tending to turn the antifriction screw connected element of that clutch mechanism in the direction opposite that in which the other element of such clutch mechanism is capable of turning. By such action the friction clutch unit acts as a friction brake to prevent turning of the drive element.

Various additional objects and advantages of the control mechanism will be understood from the following description of the preferred form of mechanism shown in the accompanying drawings.

Figure 1 is a side elevation view of the antifriction screw and its control mechanism with parts broken away to show internal structure.

Figure 2 is a transverse section through the control mechanism taken on line 2—2 of Figure 1, and Figure 3 is a further transverse section through the control mechanism taken on line 3—3 of Figure 1.

The antifriction screw mechanism shown in Figure 1 as including the screw 1, cooperating nut 10 and balls 11 interengaged between the screw and nut is conventional. In this particular application the screw is long and its end 12 is connected in any suitable fashion to the load to be driven. The screw is operable to move the load axially, but will itself be held against rotation in any suitable way. Longitudinal reciprocation of the screw is effected by rotation of the nut 10.

While screws of the acme thread type are irreversible, that is, an axial load on the screw in one direction or the other will not cause the nut to rotate, the friction in antifriction screws of proper design is so low that the nut can be rotated by exerting an axial force on the screw of moderate degree.

In mechanism of the type shown in the drawings it is desired that the screw 1 be moved longitudinally in either direction only by rotation of a drive pulley 2, however great the axial load may be on the screw 12 and in whichever direction such loads may act. The drive shaft 20, on which the drive pulley 2 is mounted, may be connected directly to the nut 10 or formed integral with it. In order to enable the shaft 20 to drive the nut when the axis of such shaft is at an angle to the axis of screw 1, however, a universal joint has been shown interposed between the drive shaft and the nut. This universal joint includes one end element 21 connected by pin 22 to the shaft 20, and the other end element 23 connected by pin 24 to the nut 10. The two elements 21 and 23 are then pivotally interconnected through the ring 25. This universal joint is of conventional type and is not part of the present invention.

The antifriction screw and nut 1 and 10 are illustrated as having left hand threads, so that when a force is applied to the screw 1 tending to pull it to the right, a force will be applied to the nut 10 tending to rotate it in a counterclockwise direction, as viewed from the right. The purpose of the control mechanism for the drive shaft 20, therefore, is to prevent such counterclockwise rotation of the nut 10 by such load, while at the same time the control mechanism does not prevent shaft 20 being turned in either direction by application of torque to pulley 2 for the purpose of driving screw 1 to the right in the direction the assumed load force acts on the screw, or to the left, opposed to the load.

Conversely, if the axial load applied to screw 1 should reverse at any time and act toward the left, a torque would be applied to the nut 10 by it tending to rotate nut 10 in a clockwise direction as viewed from the right of Figure 1. In this instance the control mechanism should act to prevent rotation of the nut in this direction, again without interfering with the ability of a torque applied to pulley 2 to drive the nut positively in either direction. Moreover, the control mechanism must be capable of reversing its action from resisting rotation of nut 10 in one direction by a load applied to screw 1, to resisting rotation of the nut in the opposite direction by reversal of the load on screw 1, almost instantaneously, so that no appreciable involuntary axial movement of screw 1 can occur.

The control mechanism for thus restraining involuntary rotation of nut 10 includes the double acting disk 3 carried by shaft 20 and rotatable with it. This disk may be formed integral with such shaft, as shown in Figure 1, or may be suitably secured to it and its axially opposite faces may be covered with suitable sheet friction facings 30.

At opposite sides of the disk 3 are mounted friction rings 4 and 5, respectively, which are independently mounted in the casing 31 encircling the control mechanism. Thus the ring 4 may have an axially projecting flange 40 which is rotatively isolated from both the shaft 20 and the casing 31 by bearings 41 and 42, respectively, of the antifriction type. Bearing 41 having its inner race mounted on shaft 20 and its outer race engaged by the inner periphery of flange 40, renders the friction ring 4 and shaft 20 relatively rotatable. The inner race of bearing 42 is mounted on the outer periphery of flange 40, and the outer race of this bearing is received in a groove of cap 32 screwed into the corresponding end of the casing 31. Similarly, the bearing 51 is interengaged between shaft 20 and the inner periphery of flange 50 on friction ring 5 to render such ring and shaft 20 relatively rotatable. Bearing 52, corresponding to bearing 42, is similarly interengaged between the outer periphery of flange 51 and cap 33 screwed into the end of casing 31 opposite cap 32.

The outer races of bearings 42 and 52 are received in recesses of caps 32 and 33, respectively, and in recesses of flanges 40 and 50, respectively, such that thrust of either friction ring toward its cap is transmitted to its outer bearing and in turn to the cap. Bearings 42 and 52 should therefore be of the combined radial and thrust type. The spacing between rings 4 and 5, and consequently the clearance afforded for disk 3 carried by shaft 20, can be adjusted by the extent to which caps 32 and 33 are screwed into the opposite ends of casing 31. If necessary, the caps can then be secured in their adjusted positons relative to the casing by any suitable means. Preferably these caps are adjusted so that the spacing between the friction faces of rings 4 and 5 does not appreciably exceed the radial width of disk 3, but clearance is just barely afforded.

On the periphery of friction ring 4 are formed ratchet teeth 43 which are engaged by pawls 44, located diametrically of the friction ring. Each of these pawls is carried by the free end of a spring leaf 45 having its opposite end anchored to the housing 31 by screws 46. The springs 45 act to push the pawls 44 through apertures in housing 31 which receive them into engagement with the ratchet teeth 43. It will be evident from Figure 2 that when the friction ring 4 is urged in the direction indicated by the arrow, a ratchet tooth will engage against a side of the pawl to prevent rotation of the ring in that direction, whereas a force tending to rotate the ring in the opposite direction will push a ratchet tooth against the end of the pawl 44, forcing the pawl outward in opposition to the resilience of spring 45 until the ratchet tooth has slipped by the pawl.

While the action of the pawls 44 to limit rotation of ring 4 to a single direction can be accomplished by providing only one pawl, the amount of lost motion can be reduced by using two, as shown in Figure 2 of the drawings, and locating them with respect to the ratchet teeth so that one of the pawls, shown as the one at the lower left, will be in friction disk holding engagement with a tooth, whereas the other pawl, shown as the one at the upper right will be approximately half way between ring holding engagement with pawl teeth. Rotation of the friction ring can thus be limited within an angular movement of the ring equal to one-half the angle between adjacent teeth.

As shown in Figure 3, friction ring 5 has around its periphery ratchet teeth 53 corresponding to the teeth 43 on friction ring 4. With these teeth cooperate one or more pawls 54, comparable to the pawls 44 cooperating with the teeth 43 of friction ring 4. These pawls 54 similarly are carried by leaf springs 55 secured to the casing or housing 31 by screws 56. Again the relationship between the two pawls 54 and the teeth 53 of ring 5 is such that when the ring 5 is prevented from rotating in the direction indicated by the arrow because of the engagement of a side of a tooth 53 with the upper left pawl 54, the lower right pawl 54 will be in a position approximately halfway between holding ratchet tooth engaging position.

If the load on the screw 1 acts axially to the right as seen in Figure 1, the right side of disk 3 will be pressed against friction ring 5. Moreover, the pull on screw 1 will tend to turn the nut 10 and disk 3 counterclockwise, as viewed from the right, so that the engagement between this disk and friction ring 5 will tend to turn this ring clockwise, as viewed from the left, in the manner indicated by the arrow of Figure 3. Because ring 5 is held against rotation in this direction by one or the other of pawls 54, disk 3 and ring 5 will serve as a brake holding shaft 20 from being turned by the action of the loaded screw 1 on the nut 10. If the axial load on screw 1 in the same direction increases, the pressure between the friction surfaces of disk 3 and ring 5 will be increased correspondingly by the increased pressure. It is important that the area of the surfaces of disk 3 and ring 5 in contact will be sufficient and their nature will be such as to prevent slippage under all tension load conditions on screw 1.

Despite design of the plate and ring surfaces to prevent inadvertent rotation of shaft 20, such rotation is still prevented by a friction action rather than a positive lock. Consequently, if it is desired to turn shaft 20 positively in a counterclockwise direction, as viewed from the right, for the purpose of moving screw 1 to the right when it is under load, it is merely necessary to apply to pulley 2 sufficient torque to overcome the friction between the surfaces of disk 3 and ring 5 which are in contact. If, on the other hand, it is desired to drive screw 1 in the opposite direction, against the action of the load, pulley 2 should be rotated in the clockwise direction as viewed from the right, or the counterclockwise direction as seen in Figure 3. While such operation of the drive pulley may increase the pull to the right in shaft 20 and thus increase the friction between disk 3 and ring 5, the resistance to rotation for the purpose of moving screw 1 in such direction will not be excessive because in this instance it is not necessary to move the friction surfaces of disk 3 and ring 5 relatively. On the contrary, these surfaces will move together because ring 5, being rotated in the opposite direction, will ratchet past the pawls 54 as their supporting springs 55 yield to permit such action.

If the load on screw 1 is being exerted axially to the left instead of to the right, the pressure between disk 3 and friction ring 5 will be negligible. Pressure will now be exterted between the left side of disk 3, as seen in Figure 1, and friction ring 4, however, corresponding to the axial load on screw 1. This load will tend to rotate nut 10 clockwise, as viewed from the right, or counterclockwise, as indicated by the arrow in Figure 2, if viewed from the left. Shaft 20 will be held against rotation in this direction by the friction produced between the left side of disk 3 and ring 4, because a pawl 44 will hold ring 4 from rotating.

While, again, involuntary rotation of shaft 20 is prevented, the screw can be shifted axially in either direction while under such a load merely by turning pulley 2 positively. If it is desired to move the screw toward the left, the pulley 2 will be rotated in a counterclockwise direction, as viewed from the left, so as to effect slippage between the disk 3 and the friction ring 4, such rotation of the shaft and nut being aided by the load on screw 1. If, on the other hand, it is desired to move screw 1 toward the right in opposition to the load, pulley 2 will be turned in a clockwise direction as viewed from the left, in which case it is unnecessary to cause the disk 3 to slip relative to friction ring 4. Instead, they will move conjointly because the ratchet teeth 43 will engage the ends of pawls 44 and press them outwardly as the ring 4 rotates in the direction opposite that indicated by the arrow in Figure 2.

It will thus be seen that in whichever direction an axial load is applied to screw 1, and whether such load may change from one direction to the other, engagement of disk 3 with one or the other of rings 4 and 5 will produce a braking action preventing involuntary rotation of shaft 20. If it is desired to rotate this shaft positively in either direction, however, for the purpose of shifting screw 1 axially in one direction or the other, such movement can be accomplished merely by turning pulley 2 in the appropriate direction, entirely irrespective of the direction or degree of load on screw 1, without in any way regulating the control mechanism. Its holding action on shaft 20 is entirely automatic when torque is not being applied to pulley 2 and release of the holding action likewise is completely automatic and instantaneous when positive torque is applied to pulley 2 in either direction.

While the holding mechanism for the friction rings 4 and 5 has been described of the ratchet type, which is a convenient and economical structure, it will be understood that any type of irreversible holding mechanism may be used instead of the ratchet arrangement shown, if desired. The important feature of the structure is that each of the friction rings 4 and 5 be capable of rotating in one direction only to any appreciable extent that one of these rings be capable of rotation only in one direction and that the other ring be capable of rotation only in the opposite direction such directions of permissible rotation being those opposite the directions in which an axial load on screw 1 tends to rotate shaft 20 respectively. Also, the holding mechanism utilized should hold the friction ring in each instance with minimum possible reverse rotation.

I claim as my invention:

1. Control mechanism for coacting screw and nut elements, comprising a shaft connected to rotate with one of such elements, disk means encircling said shaft, defining friction surfaces facing in opposite directions axially of said shaft and movable in opposite directions axially of said shaft by lengthwise movement of said shaft, friction rings encircling said shaft adjacent to said friction surfaces, respectively, one of said friction rings being engageable with the friction surface of said disk means adjacent to it by lengthwise movement of said shaft in one direction and by such engagement being operable to exert a braking force opposing rotation of said shaft in a first rotative direction but being inoperative to exert an appreciable braking force opposing rotation of said shaft in the opposite rotative direction, and the other friction ring being frictionally engageable with the friction surface of said disk means adjacent to it by lengthwise movement of said shaft in the opposite direction and by such engagement such other friction ring being operable to exert a braking force opposing rotation of said shaft in the rotative direction opposite such first rotative direction but being inoperative to exert an appreciable braking force opposing rotation of said shaft in said first rotative direction, said friction rings having annular flanges, a casing, bearing means interengaged between the inner surface of each friction ring flange and said shaft, enabling said shaft to rotate relative to said friction rings, and bearing means in the same radial plane of said shaft as said first bearing means and interengaged between the outer surface of each friction ring flange and said casing, enabling said friction rings to rotate relative to said casing.

2. The control mechanism defined in claim 1, in which the bearing means interengaged between each friction ring and the casing is of the combined radial and thrust type, operable to hold its friction ring against movement axially of the shaft under the influence of pressure exerted thereon by the disk means.

RICHARD H. WEILAND.

References Cited in the file of this patent

UNITED STATES PATENTS

| Number | Name | Date |
|---|---|---|
| 2,299,765 | Rauen | Oct. 27, 1942 |
| 2,424,912 | Briggs | July 29, 1947 |

FOREIGN PATENTS

| Number | Country | Date |
|---|---|---|
| 559,063 | Great Britain | Feb. 2, 1944 |
| 563,489 | Great Britain | Aug. 16, 1944 |
| 581,584 | Great Britain | Oct. 17, 1946 |
| 57,376 | Norway | Dec. 21, 1936 |